United States Patent
Magdaleno et al.

(10) Patent No.: US 8,300,732 B1
(45) Date of Patent: Oct. 30, 2012

(54) DC OFFSET REMOVAL USING DIGITAL FEEDBACK

(75) Inventors: Mark Magdaleno, Escondido, CA (US); John B. Groe, Poway, CA (US)

(73) Assignee: Quintic Holdings, Santa Clara, CA (US)

( * ) Notice: Subject to any disclaimer, the term of this patent is extended or adjusted under 35 U.S.C. 154(b) by 358 days.

(21) Appl. No.: 12/465,581

(22) Filed: May 13, 2009

Related U.S. Application Data

(60) Provisional application No. 61/052,971, filed on May 13, 2008.

(51) Int. Cl.
  *H04L 25/06* (2006.01)
  *H03D 1/04* (2006.01)
  *H04B 1/12* (2006.01)

(52) U.S. Cl. ................ 375/317; 375/346; 455/296

(58) Field of Classification Search .......... 375/316–317, 375/319, 346, 350; 455/131, 136, 139, 296, 455/313, 323–324, 339, 316–317, 319, 346, 455/350
  See application file for complete search history.

(56) References Cited

U.S. PATENT DOCUMENTS

| | | | | |
|---|---|---|---|---|
| 7,146,141 | B2 * | 12/2006 | Chen | 455/232.1 |
| 7,164,901 | B2 * | 1/2007 | Zheng et al. | 455/324 |
| 7,336,937 | B2 * | 2/2008 | Tervaluoto et al. | 455/232.1 |
| 7,409,199 | B2 * | 8/2008 | Igarashi et al. | 455/296 |
| 7,469,137 | B2 * | 12/2008 | Jensen | 455/333 |
| 2003/0109241 | A1 * | 6/2003 | Kim | 455/324 |
| 2007/0109064 | A1 * | 5/2007 | Micko | 331/158 |

* cited by examiner

*Primary Examiner* — Lawrence B Williams
(74) *Attorney, Agent, or Firm* — Blairtech Solution LLC

(57) ABSTRACT

Apparatus and methods for removing dc offsets in feedback loops such as may be used in communication circuits are disclosed. A comparator may be used to sample the output of the feedback loop, with the comparator output applied to a DSP module. The DSP module is configured to determine a dc offset in the output signal and generate an offset correction signal, which may then be applied to the input of the feedback loop to adjust the dc offset.

18 Claims, 6 Drawing Sheets

One Embodiment of a Digital Feedback Loop to Remove DC Offsets

Typical Radio Receiver Implementing Direct Conversion
or Low-IF Approach (PRIOR ART)

Feedback Loop to Remove DC Offset (Prior Art)

Response for the Circuit of FIG. 2(a)

Digital Feedback Loop to
Remove DC Offsets (Prior Art)

One Embodiment of a Digital Feedback Loop
to Remove DC Offsets

One Embodiment of Dither Modification

Power Spectrum of EDGE Modulated Signal

Frame Timing for One Embodiment of a Digital Feedback Loop to Remove DC Offsets for Narrowband Slotted Mode Signals A Block Diagram of One Embodiment of a Digital Feedback Loop to Remove DC Offsets for Narrowband Slotted Mode Signals

DC OFFSET REMOVAL USING DIGITAL FEEDBACK

CROSS REFERENCE TO RELATED APPLICATIONS

This application claims priority under 35 U.S.C. §119(e) to U.S. Provisional Patent Application Ser. No. 61/052,971, entitled DC OFFSET REMOVAL USING DIGITAL FEEDBACK, filed May 13, 2008, the content of which is incorporated by reference herein in its entirety for all purposes.

FIELD OF THE INVENTION

The present invention relates generally to radio receivers. More particularly, but not exclusively, the present invention relates to apparatus and methods for the removal of dc offsets that degrade performance.

BACKGROUND

A radio receiver selects a desired signal amongst several potentially strong interfering signals. To operate properly, it must minimize circuit effects that add unwanted artifacts to the received signal such as distortion, noise, and dc offsets. In practice, it's possible for these artifacts to degrade performance and even saturate the receiver.

A typical radio receiver is shown in FIG. 1. It uses a single RF downconverter to translate the received signal to baseband. In practice, the baseband frequency equals dc (for direct conversion architectures) or lies near dc (low-IF approach). At baseband, the A/D converters sample the received signal and convert it into digital data. An automatic gain control (AGC) system in the digital MODEM allows the receiver to process a wide variety of signal levels.

The direct conversion and low-IF receiver architectures allow highly integrated radio solutions. Unfortunately, these approaches also suffer from a number of problems. Since direct conversion schemes center the baseband signal at dc, these receivers are sensitive to dc offsets and even order distortion. Narrowband signals like GSM/EDGE present a greater challenge.

Traditionally, the radio receiver includes multiple feedback loops to remove dc offsets at critical points and to avoid saturation of its high-gain stages. The feedback loops affect the system's response and must be stable. Moreover, the resulting response cannot affect the desired signal. This can be challenging since the receiver's gain changes dynamically.

In practice, the dc offset correction loop generally uses analog signal processing techniques. Unfortunately, the analog circuits show sensitivities to signal levels, process parameters, supply voltages, and layout effects. As such, they oftentimes need to be redesigned when conditions change.

It therefore would be advantageous to eliminate as much analog signal processing as possible and rely on digital methods to remove the dc offsets.

SUMMARY

In one or more embodiments of the present invention, apparatus and methods that exploit digital techniques to remove dc offsets in feedback loops such as may be used in communication devices are described.

In one aspect, the present invention is directed to an apparatus for removing a dc offset in a feedback loop comprising a comparator coupled to an output of the feedback loop to sample a feedback loop output signal, a digital signal processing (DSP) module coupled to the comparator to determine a dc offset level in the output signal and a digital to analog (D/A) converter coupled to the DSP module to provide an offset compensation signal based on the dc offset level.

In another aspect, the present invention is directed to a method for reducing a dc offset in a feedback loop, comprising sampling an output signal of the feedback loop with a comparator to generate a comparator output signal, providing the comparator output signal to a DSP module, determining, in the DSP module, a dc offset level in the output signal and generating an offset compensation signal based on the dc offset level.

Additional aspects of the present invention are described below in conjunction with the appended drawings.

BRIEF DESCRIPTION OF THE DRAWINGS

The following is a brief description of the drawings wherein.

DETAILED DESCRIPTION

Figure 2A:
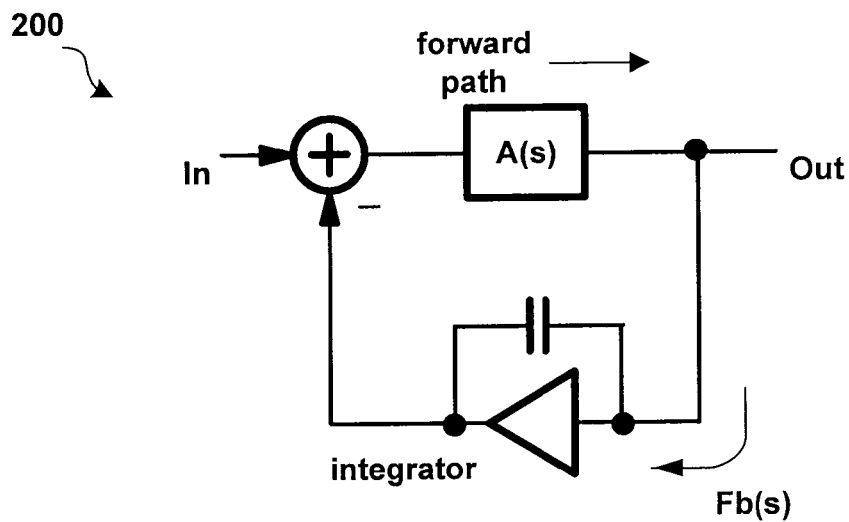
FIG. 2a shows a diagram of a simple feedback loop to remove dc offsets.
Figure 2B:
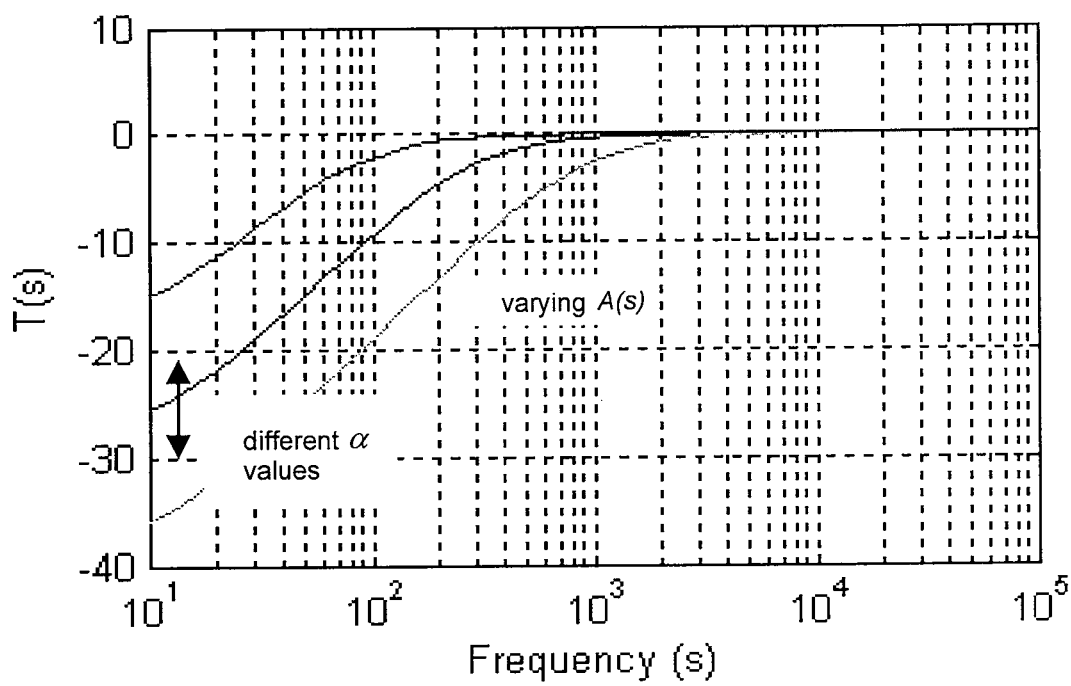
FIG. 2b depicts the system response for the simple dc feedback loop.

A simple feedback loop to remove dc offsets is shown in FIG. 2a. It uses an integrator to drive the feedback point and minimize the dc output level. The resulting transfer function equals $$T(s) = \frac{A(s)}{1 + A(s)fb(s)} \quad (1)$$

where A(s) models the forward gain and fb(s) represents the feedback path. Since the feedback fb(s) includes an integrator, the overall system response shown in FIG. 2b reveals a notch at dc. Note that the response and stability of the dc feedback loop depends on A(s). If A(s) varies, then the overall system response of the dc feedback loop moves. (This is commonplace if the forward path includes a variable gain amplifier controlled by the receiver's AGC system.) More importantly, the ability to reduce dc offsets changes—it solely depends on the dc loop gain given by A(s) fb (where s equals 0 or dc)—with $$a(s) \cdot (dc \text{ after cal}/dc \text{ before cal}) = 1/(1+A(s) \cdot fb) \quad (2)$$

This behavior is unacceptable. To compensate and reduce this effect, the feedback function fb(s) must track the forward gain A(s). As a result, the design of the integrator depends on the circuits comprising A(s).

Figure 3:
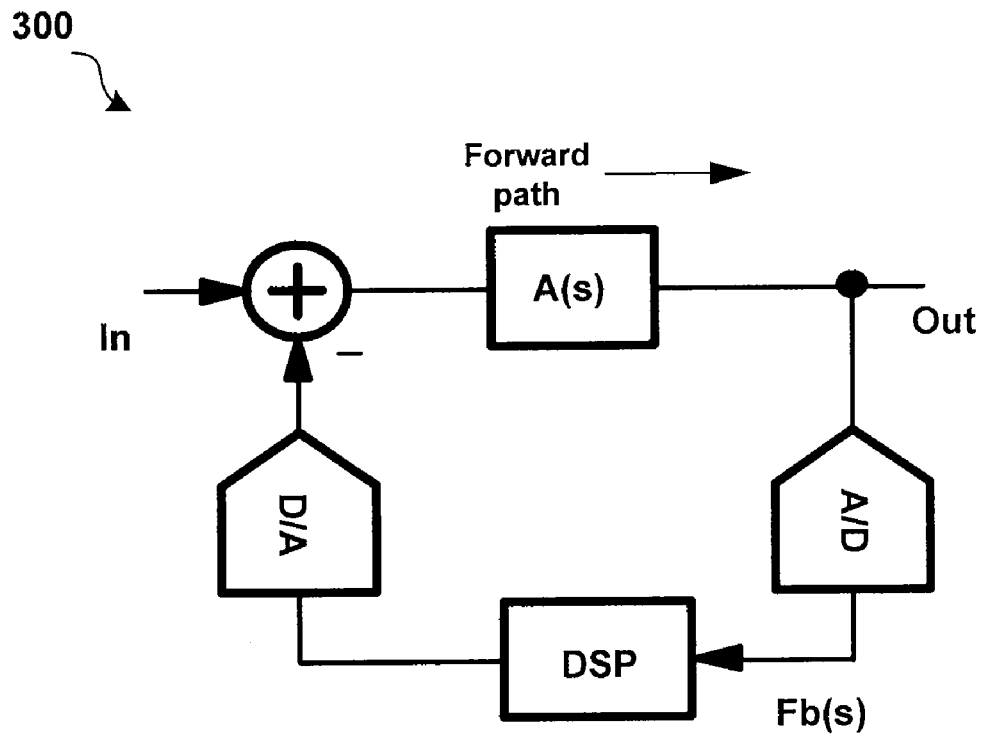
FIG. 3 shows a digital feedback loop to remove dc offsets based on an A/D converter.

It is possible to sense the dc offset using the alternative digital system shown in FIG. 3. The system relies on a pair of companion data converters. A digital algorithm determines the dc output level and supplies the appropriate feedback signal to reduce it. In practice, the A/D converter also samples any potentially large interfering signals as well as the desired signal. This means the A/D converter must have a wide dynamic range. It's common and necessary that the A/D converters interfacing to the digital modem meet this requirement.

Figure 1:
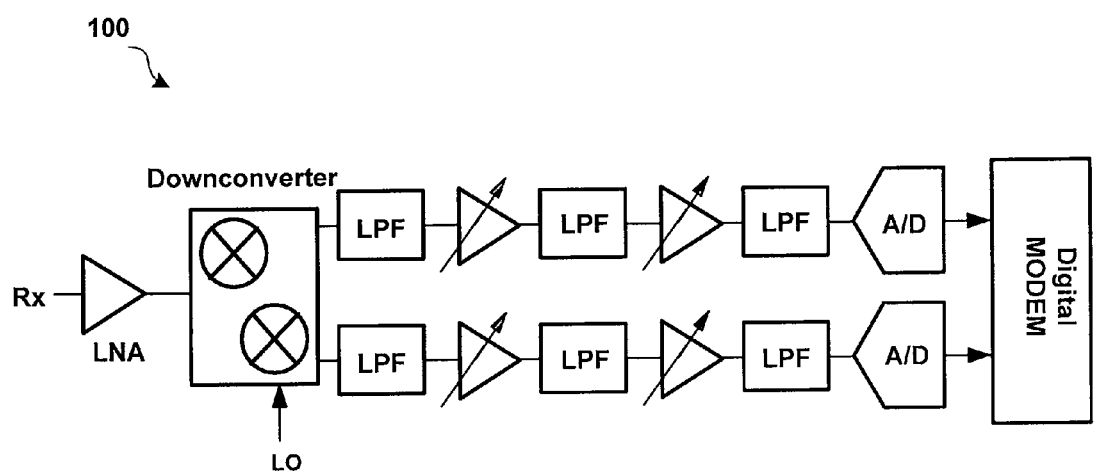
FIG. 1 shows a diagram of radio receiver implementing a direct conversion or low-IF architecture.

A typical radio receiver generally includes two or three variable gain amplifiers (VGAs) and filter stages (LPFs) as illustrated in FIG. 1. These stages respond to the AGC system and reduce the range of signal levels applied to the A/D converter. In practice, the high gain of these stages amplifies dc offsets and potentially saturates the receiver at multiple points. To combat this, the dc level must be sensed and removed at critical points in the receiver. Unfortunately, this requires more than the A/D converters at the interface to the digital modem.

Figure 4A:
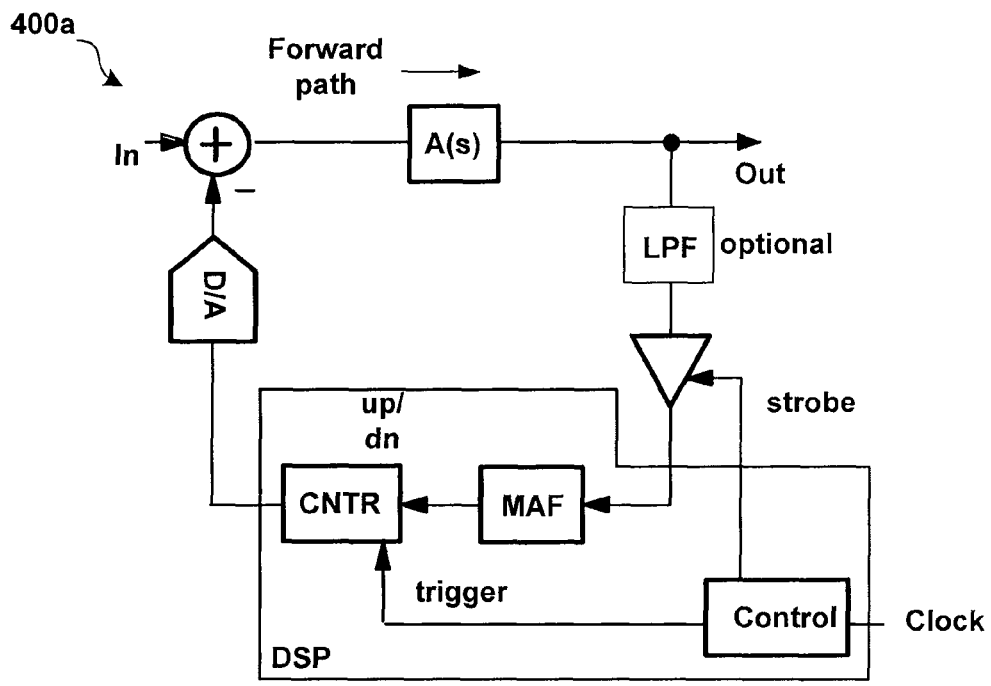
FIG. 4a shows one embodiment of a digital feedback loop, in accordance with aspects of the present invention.

FIG. 4a shows one embodiment of a feedback loop in accordance with aspects of the present invention to remove dc offsets, that relies on analog functions and an innovative digital signal processing (DSP) algorithm implemented on a DSP module including memory and a processor, DSP or other programmable device. It replaces the A/D converter and samples the output signal with a single comparator. The comparator is configured to determine the sign of the differential output signal. The DSP module includes an algorithm to integrate and average the samples to provide an improved measure of the output dc level. The resulting measure may then be used to adjusts a D/A converter to cancel the output dc level.

One embodiment of a DSP module and processing algorithm in accordance with aspects of the present invention is further detailed as follows. The comparator output drives a moving average filter (MAF) that accumulates the samples over a window of time (This realizes the integration function needed to resolve the dc level). Its output then directs an up/down counter that stores the data applied to the D/A converter. The feedback factor fb(s) may be selected based on the comparator's sample rate, the MAF filter's length, and the counter's clock frequency. Moreover, these parameters provide a straightforward way to adjust the gain of the feedback path (to compensate for changes in the forward path A(s)). For example, increasing the comparator's sample rate or the counter's clock frequency may be done to adjust the gain of the feedback factor higher, while extending the MAF's filter length may be done to adjust the feedback factor lower). As a result, the response of the system may be set to remain constant at different forward path A(s) gain settings. In practice, this may be implemented in a straightforward fashion if the AGC system is used to control fb(s) along with A(s).

The DSP algorithm causes the feedback loop to operate as a discrete-time, non-linear system. This advantageously allows the system to accelerate loop settling, minimize the low frequency notch, add hysteresis, and quiet the dc correction. For example, the up/down control depends on the MAF filter output—a large output directs the counter to step multiple values while a very small (noise-like) output disables the counter. The result is an intelligent feedback loop that is well suited to dynamic wireless applications.

Figure 4B:
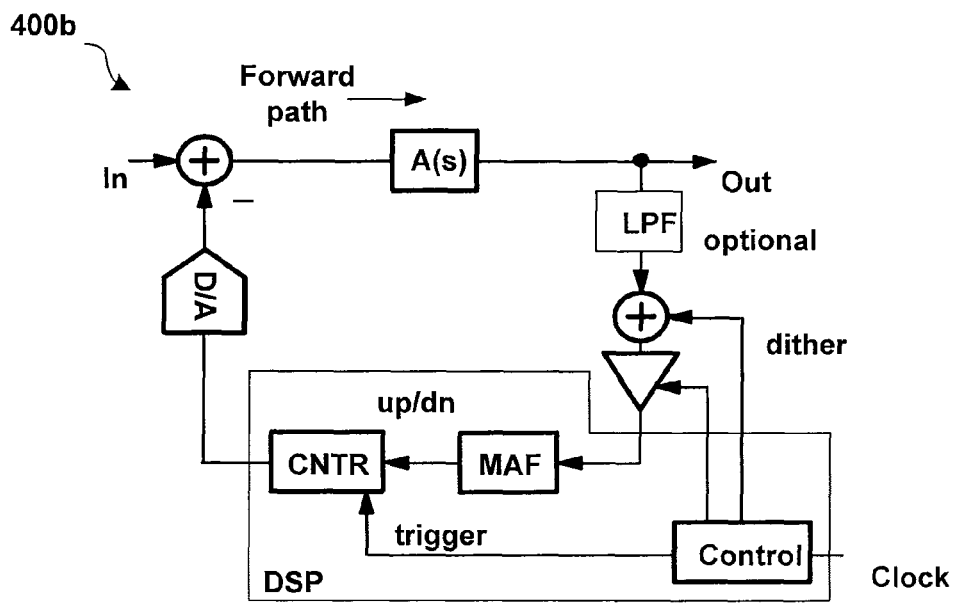
FIG. 4b shows one embodiment of a digital feedback loop with an added dither signal, in accordance with aspects of the present invention.

Use of an analog comparator greatly simplifies the design of the dc feedback loop. Its requirements are both easy and straightforward compared to an analog integrator or A/D converter. Moreover, in some embodiments it's possible to relax the requirements further by using a dither signal as shown in FIG. 4b. The dither signal modulates the output signal's dc offset and makes the signal busy. It may be realized with a pseudo-random number generator that has a Gaussian distribution with a mean value equal to zero. The dither signal allows the feedback loop to resolve small dc offsets and eases the design of the analog comparator. The dither signal may also extend settling time for the loop.

Figure 5:
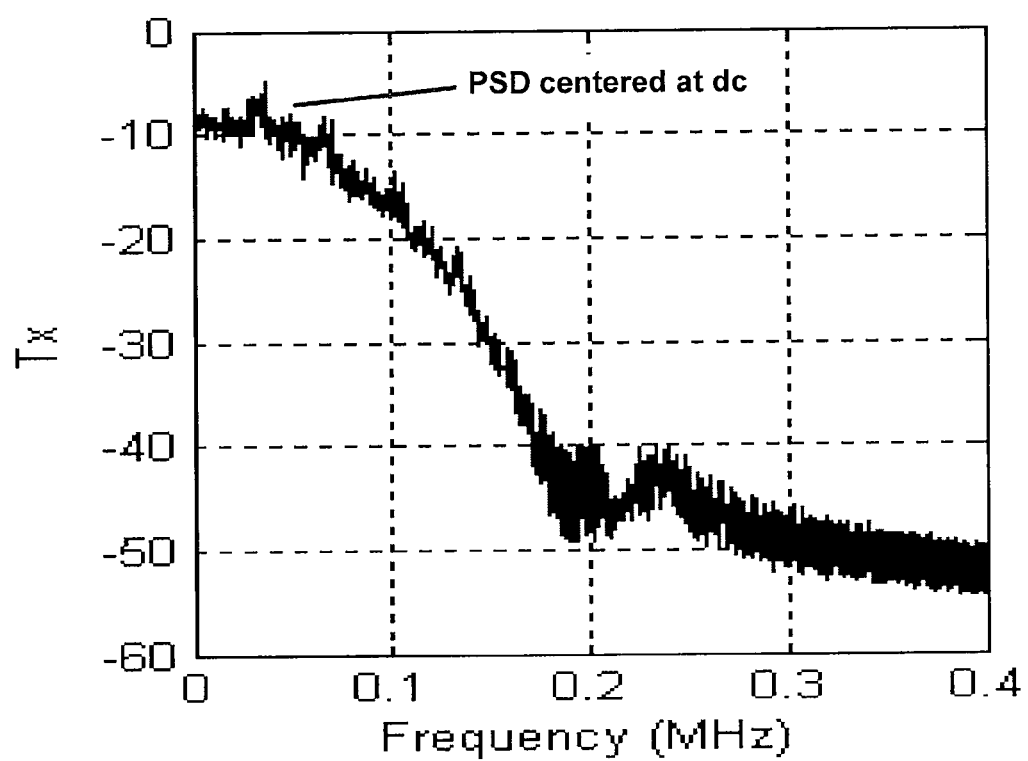
FIG. 5 displays the spectrum of a GSM modulated signal.
Figure 6A:
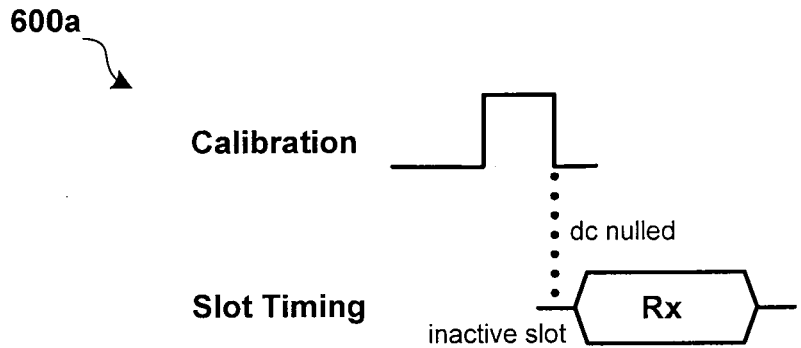
FIG. 6a illustrates the timing related to dc offset removal in a GSM/EDGE half-duplex system.
Figure 6B:
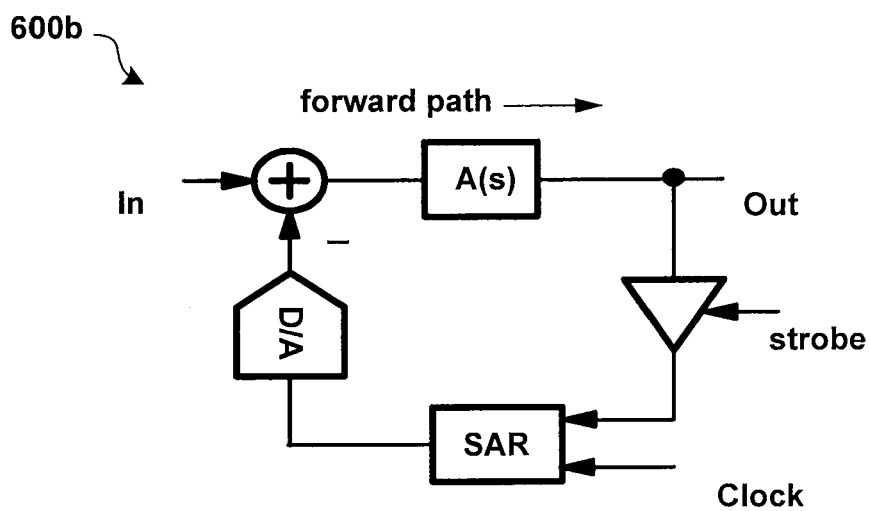
FIG. 6b shows one embodiment of a modified digital algorithm for dc feedback, in accordance with aspects of the present invention.

It is important to recognize that narrowband signals such as GSM/EDGE cannot tolerate a notch at dc. This is because their power spectral density is actually concentrated at dc as shown in FIG. 5. Fortunately, GSM/EDGE systems employ half-duplex communications with slotted mode operation. As a result, in accordance with one embodiment, the dc offset can be removed prior to an active receive slot as shown in the timing diagram of FIG. 6a. The dc offset is measured without the received signal and the appropriate correction level is found. The level is then held during the active slot. This may be accomplished by freezing the up/down counter. Alternatively, a simple successive approximation routine (SAR) can be employed as shown in the embodiment illustrated in FIG. 6b. The SAR approach is fairly straightforward and is generally faster. It tests each bit of a register, starting with the MSB, until it finds the closest code that toggles the output level. The code corresponds to the required correction value.

One implementation of a digital feedback loop in accordance with aspects of the present invention has been applied to a direct conversion radio receiver with WCDMA signals present. It cancels dc offsets at three critical points and operates continuously to reduce dc offsets to less than 5 mV even with interfering signals as strong as 400 mVpp. Moreover, this offset level is maintained at different gain settings.

One implementation of the digital feedback loop has also been used in a direct conversion radio receiver configured for EDGE operation. In this application, it reduces dc offset levels to less than 5 mV during the slot prior to the receive burst (active slot). Embodiments of these circuits and algorithms reduce analog complexity in dc feedback correction loops. Moreover, the algorithms include the flexibility to adapt the feedback loops to typical gain changes in the radio receiver. The result is a simpler and more robust solution.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An apparatus for removing a dc offset in a feedback loop, comprising:
    a comparator operative to sample a feedback loop output signal and provide a comparator output signal;
    a digital signal processing (DSP) module configured to receive the comparator output signal and, at least in part in response to the comparator output signal, determine a dc offset level in the feedback loop output signal;

a digital to analog (D/A) converter coupled to the DSP module to provide an offset compensation signal based on the dc offset level;
a moving average filter (MAF) coupled to an output of the comparator;
an up/down (U/D) counter having a variable step size, the up/down counter being coupled to an output of the MAF; and
control logic configured to:
strobe the comparator;
define a number of filter taps of the MAF; and
set at least one of the step size and/or rate for the U/D counter.

2. The apparatus of claim 1 further comprising;
a second combiner circuit having a first input coupled to the output of the feedback loop and an output coupled to the comparator; and
a dither circuit configured to generate a dither signal, said dither signal coupled to a second input of the combiner circuit.

3. The apparatus of claim 2 further comprising a lowpass filter, wherein the first input of the second combiner is coupled to the output of the feedback loop through the lowpass filter.

4. The apparatus of claim 2 wherein the dither circuit comprises a pseudorandom number generator (PNG).

5. The apparatus of claim 4 wherein the PNG is configured to generate the dither signal so as to have a zero-mean Gaussian distribution.

6. The apparatus of claim 1 wherein the control logic is configured to adjust, in response to a desired feedback factor, one or more DSP module parameters so as to set the feedback factor.

7. The apparatus of claim 6 wherein the one or more DSP parameters include a comparator sample rate, an MAF filter length and an U/D counter's clock frequency.

8. Apparatus for removing a dc offset in a feedback loop, comprising:
a comparator operative to sample a feedback loop output signal and provide a comparator output signal;
a digital signal processing (DSP) module configured to receive the comparator output signal and, at least in part in response to the comparator output signal, determine a dc offset level in the feedback loop output signal;
a digital to analog (D/A) converter coupled to the DSP module to provide an offset compensation signal based on the dc offset level;
wherein the DSP module is configured to:
selectively determine, during an inactive receive slot, the dc offset level; and
generate, during a successive active receive slot, the offset compensation signal based at least in part on the selectively determined dc offset level.

9. The apparatus of claim 1 wherein the control logic is configured to freeze, during an active receive slot, the U/D counter value so as to fix the offset compensation signal during the receive slot.

10. A method for reducing a dc offset in a feedback loop, comprising:
providing an output signal of the feedback loop to a comparator to generate a comparator output signal;
providing the comparator output signal to a DSP module;
determining, in the DSP module, a dc offset level in the output signal based at least in part on the comparator output signal;
generating an offset compensation signal based on the dc offset level;
strobing the comparator to generate a plurality of comparator output signal samples;
accumulating, in a moving average filter (MAF), the plurality of comparator output signal samples;
directing, in response to the accumulating, an up/down (U/D) counter; and
providing an output of the U/D counter to a D/A converter to generate the offset compensation signal.

11. A method for reducing a dc offset in a feedback loop, comprising:
providing an output signal of the feedback loop to a comparator to generate a comparator output signal;
providing the comparator output signal to a DSP module;
determining, in the DSP module, a dc offset level in the output signal based at least in part on the comparator output signal;
generating an offset compensation signal based on the dc offset level;
selectively determining, during an inactive receive slot, the dc offset level; and
generating, during an active receive slot, the offset compensation signal based at least in part on the selectively determined dc offset level.

12. The method of claim 11 wherein the generating includes freezing, during the active receive slot, a up/down (U/D) counter value so as to fix the offset compensation signal during the receive slot.

13. The method of claim 12 wherein said selectively determining comprises testing the bits of a register of a successive approximation register (SAR), and determining, in response to said testing of bits, a register value corresponding to a desired offset compensation level.

14. The method of claim 13, further comprising providing an input signal to the feedback loop, wherein the input signal is a GSM signal.

15. The method of claim 13, further comprising providing an input signal to the feedback loop, wherein the input signal is an EDGE signal.

16. A method for reducing a dc offset in a feedback loop, comprising:
generating a dither signal;
combining the dither signal with an output signal of the feedback loop to generate a combined output signal;
providing the combined output signal to a comparator to generate a comparator output signal;
providing the comparator output signal to a DSP module;
determining, in the DSP module, a dc offset level in the output signal based at least in part on the comparator output signal; and
generating an offset compensation signal based on the dc offset level.

17. The method of claim 16 wherein the dither signal is generated as a pseudo-noise (PN) signal.

18. The method of claim 17 wherein the PN signal has a zero-mean Gaussian distribution.

* * * * *